United States Patent
Hirth et al.

(10) Patent No.: US 10,379,312 B2
(45) Date of Patent: Aug. 13, 2019

(54) SELF-CENTERING LENS ARRANGEMENT FOR A TRANSMITTING, REFRACTIVE OPTICAL UNIT

(71) Applicant: BRUKER OPTIK GmbH, Ettlingen (DE)

(72) Inventors: Thomas Hirth, Rastatt (DE); Axel Keens, Karlsruhe (DE)

(73) Assignee: BRUKER OPTIK GMBH, Ettlingen (DE)

( * ) Notice: Subject to any disclaimer, the term of this patent is extended or adjusted under 35 U.S.C. 154(b) by 40 days.

(21) Appl. No.: 15/612,120

(22) Filed: Jun. 2, 2017

(65) Prior Publication Data

US 2018/0348466 A1 Dec. 6, 2018

(51) Int. Cl.
*G02B 7/00* (2006.01)
*G02B 7/02* (2006.01)
*G02B 13/14* (2006.01)
*G02B 21/02* (2006.01)

(52) U.S. Cl.
CPC ............. *G02B 7/003* (2013.01); *G02B 7/021* (2013.01); *G02B 7/026* (2013.01); *G02B 7/028* (2013.01); *G02B 13/14* (2013.01); *G02B 21/02* (2013.01)

(58) Field of Classification Search
CPC ........ G02B 7/021; G02B 7/026; G02B 7/008; G02B 7/003; G02B 13/14
USPC ........ 359/829, 350, 355–357, 820, 822, 830
See application file for complete search history.

(56) References Cited

U.S. PATENT DOCUMENTS

| 4,303,306 A | * | 12/1981 | Ookawa | G02B 7/026 |
| | | | | 359/819 |
| 5,856,886 A | | 1/1999 | Kaizu | |
| 5,926,326 A | * | 7/1999 | Fischer | G02B 7/026 |
| | | | | 359/819 |

(Continued)

FOREIGN PATENT DOCUMENTS

| CN | 204790170 U | 11/2015 |
| CN | 105301752 A | 2/2016 |

(Continued)

OTHER PUBLICATIONS

H. Naumann, Handbuch Bauelemente der Optik, Carl Hanser Verlag, Munich, Germany, 7th ed. 2014.

*Primary Examiner* — Zachary W Wilkes
(74) *Attorney, Agent, or Firm* — Edell, Shapiro & Finnan, LLC (57) ABSTRACT

A lens arrangement for an optical unit operating in a predetermined spectral range, includes at least two lenses (11-14, 114) of material, which transmits in the spectral range, and a common casing (15), in which the lenses are arranged sequentially. The lenses are at least substantially aligned radially, axially and angularly inclined relative to a common optical axis. Adjacent lenses in the sequence are mounted to allow relative movement therebetween. Abutment faces (2) of the lenses rest against one another. An elastic tensioner (21) pretensions the sequence of lenses in the axial direction. Only one of the lenses (11) in the sequence is axially aligned by way of the common casing. Only a portion of the lenses (11, 114) in the sequence are radially aligned by the common casing; the remaining lenses are aligned with respect to one another by the abutment faces of the respectively adjacent lenses.

20 Claims, 5 Drawing Sheets

(56) References Cited

U.S. PATENT DOCUMENTS

| | | | |
|---|---|---|---|
| 7,088,530 B1* | 8/2006 | Recco | G02B 7/021 |
| | | | 359/784 |
| 8,531,787 B2* | 9/2013 | Chen | G02B 7/021 |
| | | | 359/819 |
| 9,007,683 B2* | 4/2015 | Kubala | G02B 7/003 |
| | | | 359/356 |
| 9,042,040 B2 | 5/2015 | Kim | |
| 9,250,364 B2* | 2/2016 | Hou | G02B 13/004 |
| 2006/0171046 A1 | 8/2006 | Recco et al. | |
| 2007/0030579 A1 | 2/2007 | Chiang | |
| 2009/0015945 A1 | 1/2009 | Chen | |
| 2009/0174954 A1 | 7/2009 | Hara | |
| 2013/0271847 A1 | 10/2013 | Shi et al. | |
| 2014/0313603 A1 | 10/2014 | Fahlbusch et al. | |
| 2015/0248001 A1 | 9/2015 | Wartmann | |
| 2016/0018628 A1 | 1/2016 | Rowlette | |
| 2016/0085046 A1 | 3/2016 | Kim | |
| 2016/0216499 A1 | 7/2016 | Nobis | |
| 2016/0282593 A1 | 9/2016 | Yan | |
| 2017/0038575 A1 | 2/2017 | Pretorius | |

FOREIGN PATENT DOCUMENTS

| | | |
|---|---|---|
| DE | 102004048064 A1 | 4/2006 |
| DE | 102005023972 A1 | 11/2006 |
| DE | 102010034122 A1 | 4/2012 |
| GB | 1258365 A | 12/1971 |
| KR | 101235579 B | 3/2013 |
| WO | 2015010783 A1 | 1/2015 |

* cited by examiner

SELF-CENTERING LENS ARRANGEMENT FOR A TRANSMITTING, REFRACTIVE OPTICAL UNIT

FIELD OF INVENTION

The invention relates to a lens arrangement for an optical unit operating in a transmissive, refractive manner in a predetermined spectral range, comprising
at least two lenses, which each consist of material which transmits in the predetermined spectral range,
and a common casing, in which the at least two lenses are arranged in succession,
wherein the lenses are at least substantially aligned radially, axially and at the angle of inclination in respect of a common optical axis.

Such a lens arrangement has been disclosed by US 2016/0282593 A1.

BACKGROUND

Transmissive, refractive optical units serve to provide optical images of objects. Light (e.g. visible light or infrared light) propagates through the lenses of the optical unit and, in the process, it is refracted at the interfaces of the lens on account of the difference in the refractive index of the lens material and the refractive index of the surroundings of the respective lens. The deflection of the light is determined by the form of the interface and the difference in the refractive indices at the interface. The interfaces at which light is refractive for optical imaging may also be referred to as optically effective faces.

In the simplest case, transmissive, refractive optical units may comprise only a single lens; however, a plurality of lenses are usually arranged in succession in order to combine the properties thereof. In the case of applications in the range of visible light, the refractive power of a plurality of lenses should often be combined for particularly pronounced magnification or reduction.

Combining a plurality of lenses in succession in the light propagation direction requires a sufficiently accurate radial and axial alignment and a sufficiently accurate alignment in terms of inclination of these lenses or the optical axes thereof with respect to a common optical axis of the lens arrangement.

In order to ensure this, different alignment and fixation variants were developed over time for optical elements (lenses). An overview of these is provided in H. Naumann et al., Handbuch Bauelemente der Optik [Optical component handbook], published by Carl Hanser Verlag, Munich, 7th edition, 2014.

In one variant, which is also realized in US 2016/0282593 A1, an optical element is supported axially in a common casing. All further optical elements in the common casing are supported at the respective preceding optical element by way of spacers, and a fastener engages axially behind the last optical element. Each optical element is individually aligned in the radial direction by the common casing. In this design, possible errors (e.g. different edge thicknesses of the spacers and optical elements) may add up and propagate in the optical assembly such that there may be relatively pronounced oblique positioning of the optical axes of the last optical elements.

A propagation of errors is avoided if each optical element obtains a dedicated stopping face in the common casing and a dedicated fixation. However, this design requires a diameter that increases from optical element to optical element in order to ensure the assemblability.

In both designs, the radial alignment of the optical elements is brought about by the inner wall of the common casing in relation to the radial edge (lateral face) of the respective optical elements. The local distance between the radial edge and the optical axis of an optical element is subject to production tolerances, as a result of which a certain shift of the optical axis of the optical element emerges in relation to the common optical axis.

Moreover, a noticeable radial gap remains between the edge (lateral face) of the optical elements and the inner wall of the common casing, said gap likewise facilitating a shift of the optical elements in relation to the common optical axis and, as a result thereof, generally bringing about optical aberrations. The gap is required to compensate production tolerances of the components, and also to prevent radial clamping of the optical element and a corresponding buildup of tension in the optical element in the case of a relative radial thermal expansion of an optical element in relation to the common casing, which could otherwise lead to a distortion of the optical elements and would have an adverse effect on the imaging properties. If the radial gap is too small, in particular in view of possible temperature variations in the case of storage, transport and normal use, it is even possible for the optical element to be destroyed. Conversely, the decentering, and hence also the optical aberrations, increase in the case of a very large radial gap.

DE 10 2004 048 064 A1, or else DE 10 2005 023 972 A1, has disclosed microscope objective lenses, in which each lens is respectively arranged in a mount (holder) and set radially in a common casing by way of the respective mount.

Each individual lens is fixed in a dedicated mount within the scope of the so-called lathe centering, with the external contour thereof being post-processed on special alignment turning machines. The optical axis of the optical element is measured during this processing. Post-processing of the mount is carried out in such a way that the orientation-determining contours on the post-processed mount are placed more accurately in relation to the optical axis of the optical element. In the case of so-called alignment adhesive bonding, the optical axis of an optical element is likewise measured and the optical element is adhesively bonded in its mount in such a way that said optical element is placed precisely into the mount. As a result of this, it is possible to minimize tolerances in the radial position of the optical axis of the optical element in relation to the mount or in relation to the edge of the mount, which is decisive for the alignment in a common casing.

Lathe centering and alignment adhesive bonding are options for reducing the optical aberrations in an optical system, in particular by minimizing tolerances in the radial distance of the optical axis of an optical element from the lateral face of the mount that is relevant for the radial alignment in the common casing. However, different (radial) thermal expansions of optical element and mount, or of mount and common casing, remain problematic in these designs. Moreover, lathe centering and alignment adhesive bonding are complicated and expensive.

SUMMARY

One object of the present invention is providing a lens arrangement which, in a simple and cost-effective manner, facilitates an alignment of lenses in respect of a common optical axis with good accuracy and which, in the process, is less susceptible to errors and damage in the case of temperature variations.

This object is achieved in a simple and effective manner by way of a lens arrangement of the type set forth at the outset, which is characterized in that lenses that are adjacent to one another in the sequence are respectively mounted in a manner allowing relative movement therebetween, wherein the adjacent lenses form respective abutment faces that face one another with the transmitting material thereof, the adjacent lenses resting against one another by way of the respective abutment faces, in that an elastic tensioner is provided and configured to axially pretension the sequence of lenses, and in that only one of the lenses in the sequence is axially aligned by the common casing and only a portion of the lenses in the sequence is radially aligned by the common casing, and the remaining lenses in the sequence are aligned with respect to one another by the abutment faces that face one another of the respectively adjacent lenses, as a result of which all lenses of the sequence are aligned radially, axially and at the angle of inclination in respect of the common optical axis.

The invention proposes forming a loose stack of lenses which is arranged in the common casing and elastically pretensioned in the axial direction (along the common optical axis) by an elastic tensioner. The lens which is aligned axially by the casing (and rests axially on the casing, preferably directly but alternatively also indirectly, but not by way of another lens) forms the base of the stack.

If there are differences in the axial expansion between the common casing and the lens stack as a consequence of different coefficients of thermal expansion and temperature variations, the elastic tensioner is able to compensate these differences in expansion without the lenses being damaged as a consequence of too high compression stresses. Here, the differences in axial expansion may result directly from axial thermal expansion in this case, or else result from radial thermal expansion of lenses which leads to an axial displacement of the lenses with respect to one another, for example in the case of abutment faces of adjacent lenses that face one another and act in the form of a wedge or a funnel.

A portion of the lenses, typically one or two lenses, is aligned radially by the common casing, i.e. restricted in terms of the movement in the radial direction by way of inner walls of the casing. For this portion of the lenses, or the transmitting material thereof, a casing material may be selected, which has a coefficient of thermal expansion which approximately equals the coefficient of thermal expansion of the transmitting material (e.g. with a maximum difference of 25% in relation to the casing material). In this case, a comparatively small radial gap suffices to prevent radial clamping of the respective lens in the common casing in the case of expected temperature variations (be these during storage, transportation or else during normal operation); typical radial gap widths (in the case of an intended temperature $T_{soll}$, for example 20° C.) are usually 15 µm or less, or else one thousandth of the diameter of the lens or less. The possible shift of the optical axis of the lens is correspondingly small, and so the optical aberrations may be kept small.

For the remaining (residual) portion of the lenses, typically two or more lenses, which are not aligned radially by the common casing, it is possible to provide radial gaps of practically arbitrary size between the respective lens and the common casing without the radial alignment of these lenses being impaired. In particular, the radial gap to the common casing may be embodied to be so large that there is certainly no mutual radial contact in the case of the expected temperature variations (even outside of an intended temperature interval for use operation, for example during storage or transportation). Typical radial gaps to the common casing are 150 µm or more for the remaining portion of the lenses. The radial alignment for the lenses of this remaining portion is only brought about by way of the abutment faces to the adjacent lenses. By way of a suitable design of the abutment faces of adjacent lenses facing one another, for example by way of abutment surfaces acting in a wedge-shaped or funnel-shaped manner, it is possible to ensure that a different radial thermal expansion of the lenses does not lead to radial tension but to an axial displacement of the lenses in relation to one another, which is possible against the elastic tensioner without risk of damage.

No mounts (holders) for individual lenses are required within the scope of the invention. For an assembly in the common casing, the lenses may typically be simply inserted into a substantially circularly cylindrical cavity that is open on one side in the common casing, either in succession or as a loose stack, and subsequently be secured (typically by closing and/or tightening, for example by tightening screws, of a tensioning element).

Radially aligned means the (correct) position of the lens (optical axis of the lens) in respect of a displacement in relation to the (desired) common optical axis perpendicular thereto. Axially aligned means the (correct) position of the lens in respect of a displacement along the common optical axis in relation to a desired position along the common optical axis. Aligned at the angle of inclination means the (correct) inclination of the optical axis of the lens in relation to the (desired) common optical axis.

In many cases of application, only one lens is aligned radially by way of the casing. Often, this lens is also aligned axially by the casing. It should be noted that the lens which is aligned axially by the casing is typically also aligned at the angle of inclination by the casing and/or sets the orientation of the common optical axis in the common casing.

In a preferred embodiment of the lens arrangement according to the invention, the predetermined spectral range lies in the infrared, in particular wherein the predetermined spectral range wholly or partly comprises a wavelength range from 2 µm to 13 µm. In particular, the invention is suitable for use in infrared microscope objective lenses. Moreover, suitable lenses in the infrared spectral range can easily be produced by means of turning methods, in particular diamond turning, since a surface roughness remaining after turning processing generally tends to be uncritical in the infrared spectral range on account of the long wavelength. Infrared light may be used to obtain spectroscopic information about samples, which information may be used, for example, when determining the chemical composition of a sample. To this end, samples may be examined, in particular, in infrared microscopes. In order to orient oneself on the surface of a sample, it is usually desired also to be able to observe the sample with little magnification. Mirror objective lenses in microscopy applications, which are usable in the visible and infrared spectral range, are unsuitable for small magnifications on account of the large central obscuration. Materials for infrared-transparent lenses usually have a strong wavelength dependence of the refractive index over their broad spectral range. As a result, a single lens introduces strong chromatic aberrations. In order to compensate these, it is possible to combine lenses made of different transmitting materials in a lens arrangement according to the invention (see also below in this respect). Therefore, the use of lens-based objective lenses or lens arrangements according to the invention in IR microscopes is quite possible within the scope of the invention.

Provision may likewise be made in one embodiment for the predetermined spectral range to lie in the range of visible light, in particular wherein the predetermined spectral range wholly or partly comprises a wavelength range from 390 nm to 780 nm.

An advantageous embodiment provides for at least some of the at least two lenses to consist of different materials which transmit in the predetermined spectral range. The refractive index is strongly wavelength-dependent in many optical materials, in particular for the infrared spectral range. Then, pronounced chromatic aberrations have to be accepted in the case of individual lenses or optical systems in which all lenses are manufactured from the same optical material. In contrast thereto, if different transmitting materials with different wavelength-dependent refractive behaviors are combined in a suitable manner within the scope of this embodiment, it is possible to provide a lens arrangement by way of a mutual (at least partial) compensation of the wavelength-dependencies which, overall, has a reduced chromatic aberration (in comparison with the individual lenses). Moreover, different transmitting materials usually have different coefficients of thermal expansion. This renders it easier to find or select a casing material which has a coefficient of thermal expansion that fits well to one of the transmitting materials (lens materials); this lens material can then be used for the lens or lenses which are guided in the radial direction by the common casing.

An embodiment which provides for the abutment faces that face one another of adjacent lenses to be formed in a radially outer region of the lenses, for optically effective faces to be formed in a radially inner region of adjacent lenses, and for adjacent lenses only to rest against one another with abutment faces that face one another, but not with optically effective faces, is also preferred. This design has proven its worth in practice. The optically effective faces and the abutment faces are separated from one another both spatially and functionally and may therefore be geometrically designed independently of one another.

An embodiment which provides for lenses that are adjacent to one another in the sequence in each case to form first abutment faces that face one another is also advantageous, wherein at least one of the first abutment faces that face one another is embodied as approximately flat and approximately perpendicular to the optical axis of the respective lens in each case,
in particular such that a maximum local gradient angle α of the first abutment face does not exceed an absolute value of 15°, wherein the local gradient angle α is measured in relation to a reference plane, which extends perpendicular to the optical axis of the lens, and in a sectional plane, which contains the optical axis of the lens,
and in particular wherein the first abutment face is embodied in a rotationally symmetric manner in relation to the optical axis of the respective lens. The lens may be aligned axially and at the angle of inclination in relation to the adjacent lens by way of the first abutment faces. On account of the substantially flat (in particular no-step) and approximately perpendicular embodiment, radial sliding with respect to one another is possible without an axial offset (or with only a small axial offset in the case of a gradient angle of at most 15°) on the first abutment faces. Typically, the two first abutment faces that face one another are embodied to be approximately flat and approximately perpendicular to the respective optical axis of the lens. It should be noted that a first abutment face may have partial faces that are offset from one another or separate from one another. Rotationally symmetric abutment faces are particularly easy to manufacture and avoid misalignments between the lenses.

In a preferred development, at least one of the first abutment faces that face one another in each case extends perpendicular to the optical axis of the respective lens, in particular wherein the first abutment faces are embodied as ring-shaped plane faces. A plane (areal) mutual abutment without axial offset can be achieved in each radial displacement position of adjacent lenses in the case of (precisely) perpendicular first abutment faces, as a result of which local pressure loads are kept low. This construction assists in avoiding deformations at the lenses, particularly in the case of soft lens materials, as often find use in the IR spectral range, as a result of which good imaging properties can be obtained. Ring-shaped plane faces are easy to manufacture and permit a uniform pressure distribution over the entire circumference of the lens.

An embodiment in which lenses that are respectively adjacent in the sequence form second abutment faces that face one another is likewise advantageous, wherein one of the second abutment faces forms an opening that widens toward the other lens and/or one of the second faces forms a projection that tapers toward the other lens. The second abutment faces may also be referred to as "centering" or "oblique" abutment faces. Typically, one of the second abutment faces that face one another is embodied with an opening and the other one is embodied with a projection. It should be noted that a second abutment face can also have partial faces that are separated from one another or offset from one another; however, a second abutment face is typically embodied in a rotationally symmetric manner in relation to the optical axis of the respective lens. The second abutment faces serve to align a respective lens in a radial manner in relation to the adjacent lens. In particular, the radial movement play in relation to one another is restricted by the mutual engagement of the lenses or the second abutment faces. Here, a wedge-like or funnel-like mutual guidance may be brought about using the widening opening and/or the tapering projection, in particular wherein relative radial expansions of adjacent lenses may be converted into axial sliding by the mutual guidance.

In a preferred development of this embodiment, provision is made for a local gradient angle α of at least one of the second abutment faces to have an absolute value of between 25° and 65°, preferably between 30° and 60°, wherein the local gradient angle α is measured in relation to a reference plane, which extends perpendicular to the optical axis of the lens, and in a sectional plane, which contains the optical axis of the lens. Here, it is only necessary to consider the local gradient angle α in a region in which there could be a mutual abutment of the adjacent lenses. As a rule, a good deflecting function of radial expansion into axial offset or good mutual sliding of the lenses may be achieved in the specified gradient angle range and radial play may be kept low at the same time. Steeper (larger) gradient angles reduce the radial play and flatter (smaller) gradient angles improve the sliding of the adjacent lenses with respect to one another (with the slidability also depending on the friction coefficient, which is material dependent); both aspects can be combined with one another in the specified gradient angle range. In particular, it is possible to fashion frustum lateral faces with a gradient angle of α=45° as second abutment faces.

In a preferred development, one or more of the second abutment faces are formed at least substantially in accordance with the lateral face of a conical frustum and/or a spherical segment and/or a toric segment. These forms have proven their worth in practice and are easy to manufacture.

A development in which one of the second abutment faces that face one another forms an opening that widens toward the other lens and corresponds at least substantially to the lateral face of a conical frustum, and the other of the second abutment faces that face one another forms a projection that tapers toward the other lens and at least substantially corresponds to the lateral face of a toroidal disk, is particularly preferred. In the case of "lifting", this design allows the set up of a circumferential, line-shaped (and not only pointwise) contact between two lenses in a simple manner and with high reliability, said contact assisting in the avoidance of tension peaks, as would occur as a consequence of abutment faces resting against one another in a pointwise manner, and thus assisting in the reduction of the stress at the abutment faces.

In an advantageous development of an embodiment with first and second abutment faces, the lens arrangement is embodied in such a way that, at an intended temperature $T_{soll}$, the first abutment faces that face one another of adjacent lenses rest against one another in the sequence, in particular rest against one another in a planar fashion, and play remains between the second abutment faces that face one another of adjacent lenses, in particular wherein the intended temperature $T_{soll}$ is 20° C. As a result of the play (nominal gap) between the second abutment faces, a certain amount of play remains in the centering (radial alignment) of the lenses. Typically, a small centering error is acceptable for many applications. The play should correspondingly be so small at the intended temperature $T_{soll}$ (or else in an intended temperature interval, for example 15-40° C.) that a centering error that is permitted for the desired imaging properties of the lens arrangement is not exceeded. Then, for small temperature deviations from the intended temperature (or the intended temperature interval) in the case of different coefficients of thermal expansion of the transmitting materials of the lenses, the gap avoids lifting of the lenses (i.e. lifting of the first abutment faces from one another) due to a (usually non-areal) contact of the second abutment faces, as a result of which elevated local pressures on the lenses are avoided. The axial alignment and the alignment at the angle of inclination are very accurately maintained in the case of abutment, in particular planar (areal) abutment, by way of the first abutment faces. However, it should be noted that lifting of the lenses may be justifiable up to a certain degree. In the lifted state, the radial alignment is accurately maintained but the axial alignment is modified and the lenses may tilt in relation to one another; however, this is permitted within certain boundaries. It should be noted furthermore that the intended temperature $T_{soll}$ (or an intended temperature interval) depends on the desired application. Typical play (nominal gap width, in the case of central position) at the intended temperature $T_{soll}$ is usually 15 μm or less.

An embodiment, in which the transmitting material of all lenses of the portion of the lenses which are aligned radially by the common casing has a coefficient of thermal expansion, the difference of which to the coefficient of thermal expansion of the material of the casing is less than the corresponding difference of the transmitting material of all lenses of the portion of the lenses which are not radially aligned by the common casing, is also advantageous. Expressed differently, the coefficients of thermal expansion of the transmitting material or materials of the lenses, which are radially aligned by the common casing, lie closest to the coefficient of thermal expansion of the casing material. As a result of this, it is possible to minimize radial gaps, which must be set up as compensation space for different radial thermal expansions of lenses and casing. Accordingly, optical aberrations of the lens arrangement according to the invention are minimized overall.

In a preferred embodiment, provision is made for the lens which is axially aligned by the casing to be arranged at a first end of the sequence of lenses, and for a lens, at which the elastic tensioner engages, to be arranged at a second end of the sequence of lenses which lies opposite the first end. This design has proven its worth in practice, wherein, typically, an elastic element rests against the second end of the sequence.

What applies in general is that the elastic tensioner may have different constructions; typically, they comprise at least one elastic element (e.g. a spring or a body made of an elastomer) and a tensioning element that is axially adjustable at the casing, with the sequence of lenses (lens stack) and the elastic element being arranged axially between the adjustable tensioning element and a (stationary) counter bearing of the casing. The tensioner preferably applies contact pressure on the lens stack that is as uniform as possible (in particular uniform over the circumference and/or uniform over a contact face) in order to prevent local tension peaks and deformations of the lenses resulting therefrom. An embodiment is preferred, in which the tensioner comprises:

- an abutment ring which rests against a lens at one end of the sequence of lenses, in particular with a plane abutment ring face that extends perpendicular to the optical axis of this lens,
- a tensioning ring which, by way of a thread, in particular a male thread, is screwed into a counter thread of the casing,
- and comprising at least three spring elements, in particular leaf spring elements, which interconnect the abutment ring and the tensioning ring. The spring elements are typically arranged with a uniform distribution around the circumference of the abutment ring and tensioning ring. Usually, provision is made of exactly three spring elements with the same spring constant. The spring elements typically extend obliquely and/or over a certain circumferential angle range between abutment ring and tensioning ring, preferably approximately on an imaginary circular cylinder lateral face between abutment ring and tensioning ring, for example approximately in accordance with a helical path with the radius of an abutment ring or tensioning ring.

An embodiment in which all optically effective faces and abutment faces are produced in the same clamping operation during the manufacturing of one side of a lens is particularly preferred. This obtains a particularly high alignment accuracy of the optically effective faces. An introduction of production tolerances by re-clamping is avoided. It is also preferable for an edge (outer cylindrical face) of the lens, which is relevant for a radial alignment in the common casing, to be likewise produced in the same clamping operation.

Furthermore, an embodiment in which the lenses are produced at least in part, preferably completely, by turning, in particular diamond turning, is preferred. Turning is cost-effective and permits relatively precise manufacturing of rotationally symmetric faces which are quite suitable both as optically effective faces and as abutment faces within the scope of the invention. In the case of a predetermined spectral range in the infrared, the roughness remaining after turning does not affect the imaging properties in a noticeable manner either. In the case of a predetermined spectral range in the range of visible light, there may be post-processing for reducing the surface roughness, for example by light post-polishing.

It is likewise possible, in one embodiment, for the lenses to be produced at least in part, preferably completely, by mold pressing. The pressing tool predetermines both the optically effective faces and the abutment face, as a result of which these may be aligned with respect to one another with good accuracy. Pressing may be carried out under the application of heat, in particular in order to soften and/or homogenize the initial material for the lenses.

Likewise, an embodiment in which the lenses are produced at least in part, preferably completely, by an interferometrically regulated production method is preferred. As a result, it is possible to achieve particularly high accuracies during the tool feed.

Further advantages of the invention emerge from the description and the drawing. Likewise, the features specified above and the features yet to be explained below may, according to the invention, find use respectively on their own or together in arbitrary combinations. The illustrated and described embodiments should not be understood to be a comprehensive listing but, instead, have an exemplary character for explaining the invention.

BRIEF DESCRIPTION OF THE DRAWINGS

The invention is illustrated in the drawing and explained in more detail on the basis of exemplary embodiments. In the figures.

DETAILED DESCRIPTION

All figures respectively show schematic illustrations that are not true to scale. In particular, the gaps are illustrated in an exaggerated manner in order to make these better identifiable.

Figure 1:
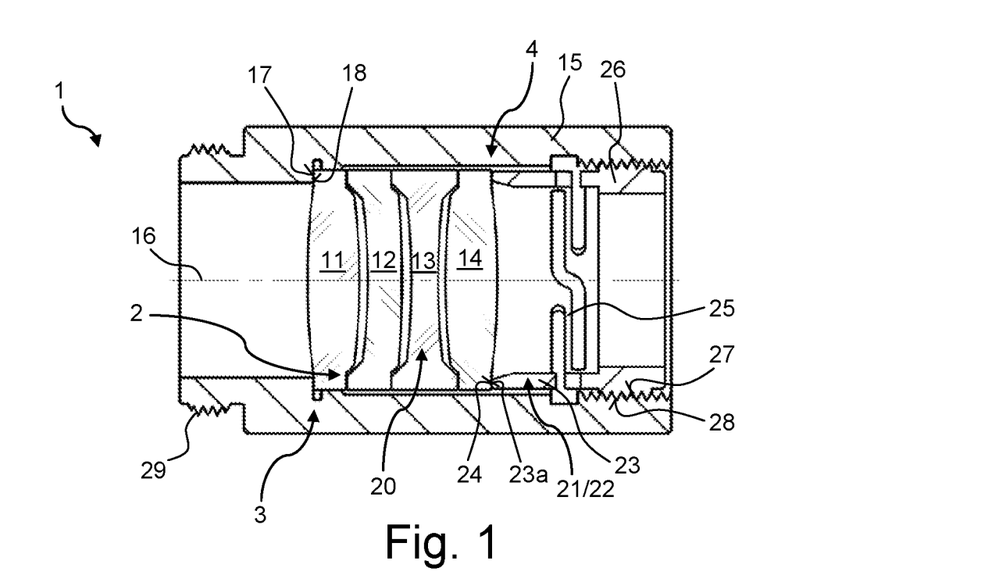
FIG. 1 shows a schematic longitudinal section through a first embodiment of a lens arrangement according to the invention, wherein only one lens is aligned radially by the common casing.
Figure 2:
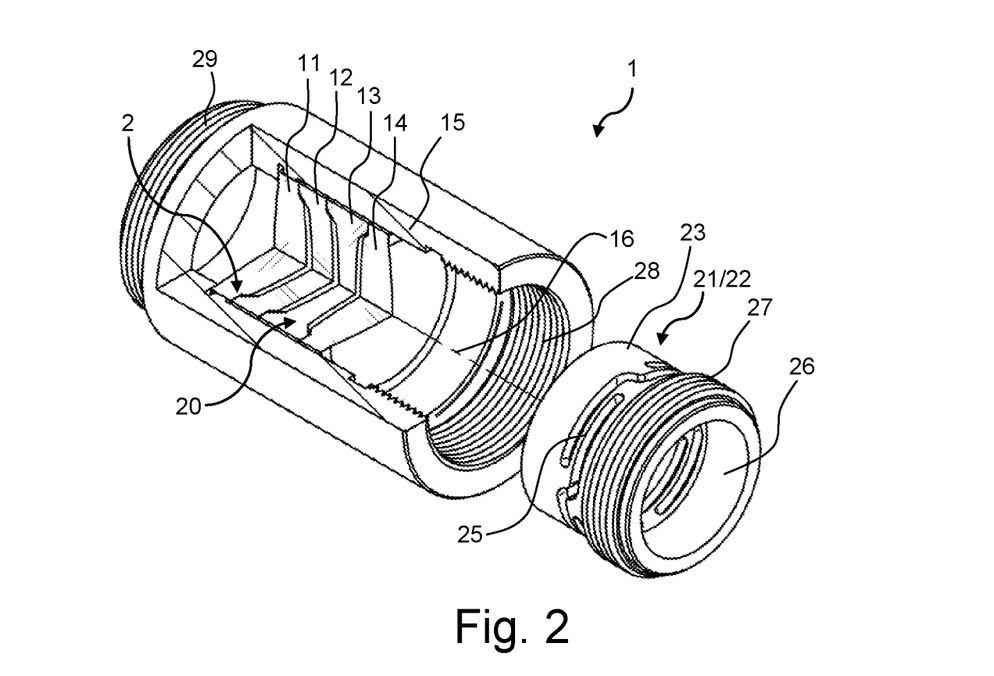
FIG. 2 shows a schematic oblique view of the lens arrangement of FIG. 1, with a disengaged tensioning device.

FIG. 1 and FIG. 2 show, in a first embodiment, a lens arrangement 1 according to the invention, in this case comprising four lenses 11, 12, 13, 14 which are arranged in a common casing 15. The lenses 11, 12, 13, 14 are arranged in succession along a common optical axis 16. The lenses 11-14 serve to provide optical imaging, in which light (in this case infrared light) propagates through the lens arrangement 1, substantially along the common optical axis 16 (from right to left in FIG. 1). For the purposes of this optical imaging, the lenses 11-14 are aligned in respect of the common optical axis 16 in a radial (i.e. at right angle to the optical axis 16) and axial (i.e. in transverse direction of the optical axis 16) manner and at the angle of inclination (i.e. at the angle of inclination of the optical axis of the respective lens 11-14 in relation to the common optical axis 16). Here, light refraction occurs at the lens surfaces.

Only one of the lenses, namely the lens 11 at a first end 3 of the sequence of lenses 11-14, is axially aligned by the common casing 15 in the shown embodiment. To this end, the lens 11 rests against a circumferential shoulder 17 of the common casing 15 with a circumferential contact face 18, in this case on the left-hand side. This axial abutment simultaneously sets the lens 11 in terms of the inclination angle (i.e. the angle of inclination of the optical axis of the lens 11 is set in relation to the common optical axis 16).

Furthermore, only one of the lenses, once again the lens 11 in this case, is radially aligned by the common casing 15, i.e. held so tightly in the radial direction by the common casing 15 that the desired radial position of this lens 11 is directly forced by the casing 15.

The next lens 12 in the sequence is retained by the lens 11 and thereby set radially, axially, and in terms of the angle of inclination. To this end, the lenses 11, 12 form abutment faces 2 that face one another. In the same way, the lens 13 is retained by the lens 12, and the lens 14 is retained by the lens 13. In particular, the lenses 12, 13 and 14 are not radially or axially retained by the casing 15 (in this respect, see also FIG. 3).

The lenses 11-14 resting against one another, which are also referred to as lens stack 20, are tensioned in the axial direction by a tensioner 21. To this end, a tensioning apparatus 22 presses with a certain force on the lens 14 at a second, right-hand end 4 of the lens stack 20 from the right. Here, the tensioner 21 or the tensioning apparatus 22 comprises an abutment ring 23 which rests on a contact face 24 of the lens 14 with a plane abutment ring face 23a. The abutment ring 23 is connected to a tensioning ring 26 by way of a plurality of spring elements 25, in this case three leaf-spring-like spring elements 25. The tensioning ring 26 acts as a tensioning element which is adjustable in the axial direction at the casing 15. To this end, the tensioning ring 26 comprises a thread 27 (a male thread in this case), by means of which it is screwable into a corresponding counter thread 28, a female thread in this case, at the casing 15. The force with which the abutment ring 23 presses against the lens 14 can be set by the screw-in depth of the tensioning ring 26. The screwed position may be secured by an adhesive spot (not depicted in any more detail).

In the shown embodiment, the casing 15 moreover comprises an end-side connection thread (a male thread in this case) 29 for attachment to an optical structure.

Figure 3:
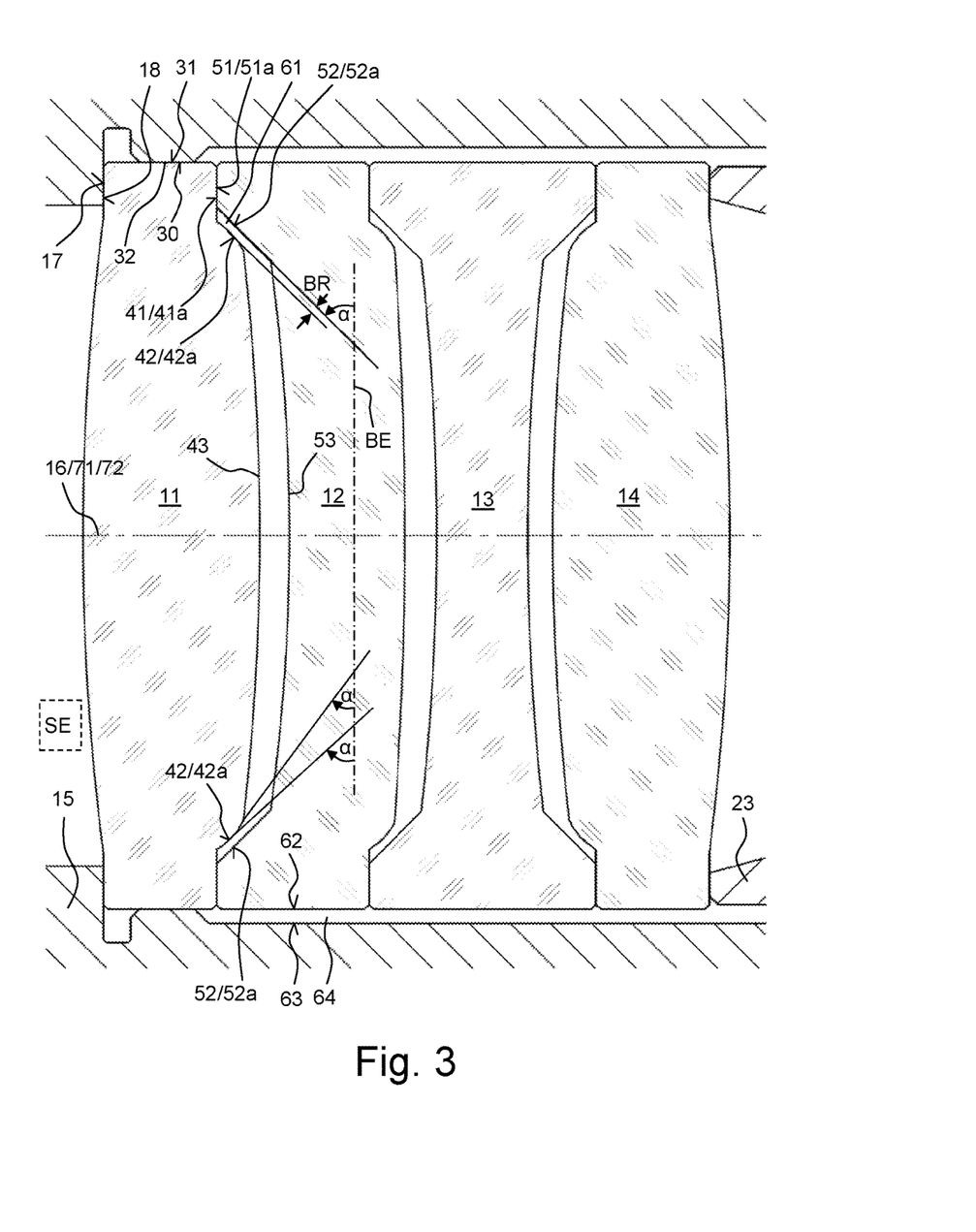
FIG. 3 shows a magnified illustration of a section of the lens arrangement of FIG. 1 in the region of the lens stack.

The alignment of the lenses 11-14 in the common casing 15 is explained in more detail in FIG. 3.

The lens 11 that was directly aligned in radial and axial fashion by the casing 15 rests, firstly, against the plane, ring-shaped shoulder 17 of the casing 15 with its plane, ring-shaped contact face 18. Secondly, the lens 11 almost rests against an inner wall 31 of the casing 15 with the radial edges (the outer cylindrical lateral face) 30 thereof; in fact, a minimum gap 32 of approximately 10 µm width in the radial direction (assuming a central position of the lens 11 in the casing 15) remains, in particular in order to be able to lead the lens 11 to the shoulder 17 in the casing 15 (insert the lens). Furthermore, this minimum gap 32 is sufficient to compensate production variations in respect of the inner diameter of the inner wall 31 of the casing 15 and the outer diameter of the lens 11, and possible differences in thermal expansion (in the case of expected temperature variations, firstly during normal operation, but also during transportation and storage) between the lens 11 and the casing 15 in the radial direction, without the lens 11 being radially clamped on the inner wall 31. Preferably, the materials of casing 15 and lens 11 are matched to one another such that the (linear) coefficients of thermal expansion thereof are as similar as possible, preferably wherein the coefficient of thermal expansion of the material of the lens deviates by at most 25% from the coefficient of thermal expansion of the material of the casing 15. The remaining lenses 12 to 14 consist of arbitrary materials, which are typically different, with the specification that the materials for all lenses 11-14 are transmitting (transparent) in a spectral range provided for the lens arrangement. Typical materials for lenses in the infrared include germanium (e.g. for lens 12; coefficient of thermal expansion $\alpha=5.5\times10^{-6}$ 1/K), zinc selenide (e.g. for lens 13; coefficient of thermal expansion $\alpha=7.6\times10^{-6}$ 1/K) and GASIR®1 (e.g. for lenses 11 and 14; coefficient of thermal expansion $\alpha=17\times10^{-6}$ 1/K). Then, brass is well-suited to be a casing material, having a coefficient of thermal expansion of $\alpha=18.5\times10^{-6}$ 1/K; in the case of the material combination of GASIR®1 and brass, the difference in the coefficient of thermal expansion is only approximately 8.1% in relation to the casing material.

A first abutment face 41 and a second abutment face 42 for the adjacent lens 12 are produced in a radially outer region of the lens 11. Here, the first abutment face 41 is embodied as a planar ring face 41$a$, which lies perpendicular to the optical axis 71 of the lens 11 (here, it coincides with the common optical axis 16). The second abutment face 42 is embodied here as a projection 42$a$ which tapers toward the lens 12, said projection in this case corresponding to the lateral face of a toric segment. Moreover, the lens 11 comprises an optically effective face 43 in a radially inner region, said optically effective face facing the lens 12 but not contacting the lens 12.

The lens is manufactured from a uniform material, into which both the abutment faces 2, 41, 42 and the optically effective faces 43 have been worked. In general, all abutment faces 2, 41, 42, optically effective faces 43, 53, optionally edges that are relevant for a radial alignment by the casing (lateral faces of the cylinder) 30 and optionally contact faces 18, 24 to the casing 15 or to the tensioner 21 are manufactured in only one clamping operation or only one clamping operation per lens side (front side, rear side) in order to minimize production tolerances; here, a typical manufacturing method comprises turning, in particular diamond turning.

A first abutment face 51 and a second abutment face 52 for the adjacent lens 11 are formed on the lens 12, once again in a radially outer region. The first abutment face 51 is likewise embodied as a planar ring face 51$a$, which is perpendicular to the optical axis 72 of the lens 12 (which coincides with the common optical axis 16). Here, the second abutment face 52 is embodied as an opening 52$a$ that widens toward the lens 11, here in the form of a lateral face of a conical frustum. Facing the lens 11, the lens 12 forms an optically effective face 53 situated in a radially inner region.

In the case of an intended temperature, which usually lies at room temperature (20° C.) but may also be selected deviating therefrom depending on application, the first abutment faces 41, 51 rest against one another, and the projection 42$a$ engages into the opening 52$a$. Here, a small gap 61 remains between the opposing second abutment faces 42, 52. The small gap 61 usually has a width BR of approximately 10-15 µm, assuming a central position (i.e., the gap 61 is depicted in a much exaggerated fashion in FIG. 3). Thus, if the first abutment faces 41, 51 rest against one another, there only remains a small radial play, within which the lenses 11, 12 may slide against one another in the radial direction via the first abutment faces 41, 51. This ensures a radial alignment of the lens 12 on the common optical axis 16, even though the lens 12 is in no way set directly by the casing 15. In particular, a radial edge 62 of the lens 12 is separated by a large gap 64 from the inner wall 63 lying opposite thereto, typically with a radial gap width of 150 µm or more such that the lens 12 cannot be clamped in the casing 15, not on account of production tolerances, nor as a consequence of the lens 12 sliding radially in relation to the lens 11, and nor as a consequence of thermal expansion effects.

The axial alignment and the alignment of the angle of inclination of the lens 12 is ensured by the planar abutment on the lens 11 via the first abutment faces 41, 51.

In a corresponding manner, the lens 13 is aligned with respect to the lens 12 by way of corresponding first and second abutment faces, and the lens 14 is aligned with respect to the lens 13 by way of appropriate first and second abutment faces. The axially pressing abutment ring 23 on the lens 14 ensures that the lenses 11-14 of the lens stack 20 lie against one another without axial play. As result, all lenses 11-14 are aligned radially, axially and in terms of inclination angle in the common casing 15, in particular along the common optical axis 16, without this requiring a further contribution by the casing 15 ("self-centering").

What may happen in the case of relatively strong temperature variations and in the case of different materials of the lenses 11-14 is that a lens 11, which forms a projection 42$a$, expands more strongly (or shrinks less strongly) in a relative way in the radial direction than a lens 12 which forms an associated opening 52$a$. As a result, there is a reduction in the gap 61 between the second abutment faces 42, 52, until, finally, the second abutment faces 42, 52 touch one another.

Figure 4:
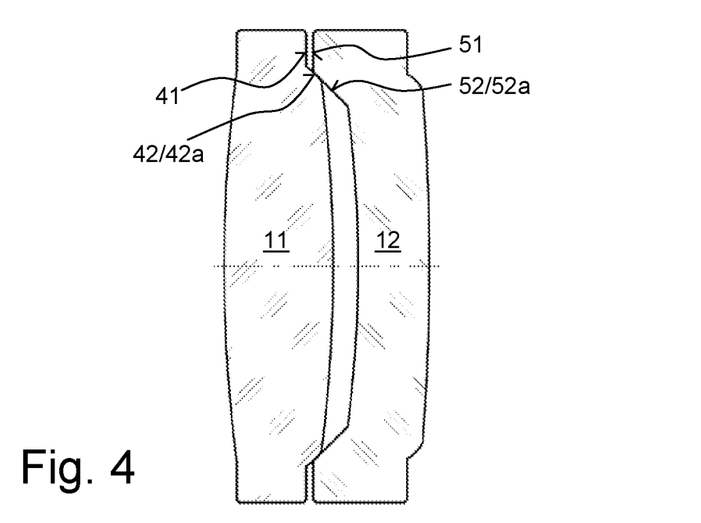
FIG. 4 shows a longitudinal section through two adjacent lenses in the lifted state.

In the state of touching contact between the second abutment faces 42, 52, a further relative radial expansion of the lens 11 in relation to the lens 12 leads to the lens 12 being displaced away from the projection 42$a$ in the axial direction, cf. FIG. 4 (which only shows lenses 11, 12 for simplification purposes), with the (areal) contact of the first abutment faces 41, 51 being lost ("lifting"). Thus, the lenses 11, 12 slide from one another with their second abutment faces 42, 52.

Here, the axial displacement of the lens 12 against the force of the elastic tensioner is easily possible without damaging the lenses 11, 12. On account of the gradient angles $\alpha$ of the second abutment faces 42, 52 (and sufficiently little friction), the lenses 11, 12 also do not get jammed; once again, see FIG. 3 in respect of the gradient angles. Typical gradient angles $\alpha$ of the second abutment faces 42, 52 lie between 30° and 60°, preferably around 45°. The frustum-lateral-face-shaped opening 52$a$ in this case comprises a uniform gradient angle $\alpha=45°$ and the toroidal-disk-lateral-face-shaped projection 42$a$ forms local gradient angles $\alpha$ between 35° and 50°. The local gradient angle $\alpha$ is measured at the respective abutment face 42, 52, in this case the second abutment face, (e.g. by means of a tangent) in relation to the reference plane BE, which extends perpendicular to the optical axis 71, 72 of the respective lens 11, 12, and determined in a sectional plane SE (in this case the plane of the drawing) which contains the optical axis of the lenses 11, 12.

It should be noted that the thermal expansions of the lenses 12-14 in FIG. 3 are uncritical not only in relation to the other lenses 11-14, but also in relation to the casing 15 as these lenses are not guided in the radial direction.

Figure 5:
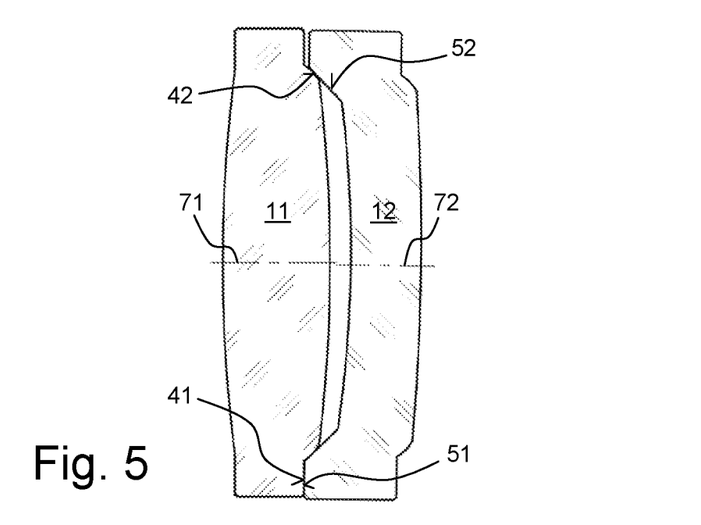
FIG. 5 shows a longitudinal section through two adjacent lenses in a lifted, tilted state.

There may be tilting of the lenses 11, 12 with respect to one another as a consequence of lifting, i.e. the adoption of the abutment contact between the lenses 11, 12 by the second abutment faces 42, 52, with the optical axis 71 of the lens 11 being noticeably tilted in relation to the optical axis 72 of the lens 12; cf. FIG. 5 (which, for simplification purposes, once again only shows lenses 11, 12 and depicts the tilt in an exaggerated manner). Here, however, the tilt is restricted by the first abutment faces 41, 51 since there ultimately is a pointwise mutual abutment of the first abutment faces 41, 51, in this case in the lower region. As a result, it is possible that, in individual cases, the predetermined specifications for the lens arrangement may still be maintained, despite "lifting".

Figure 6:
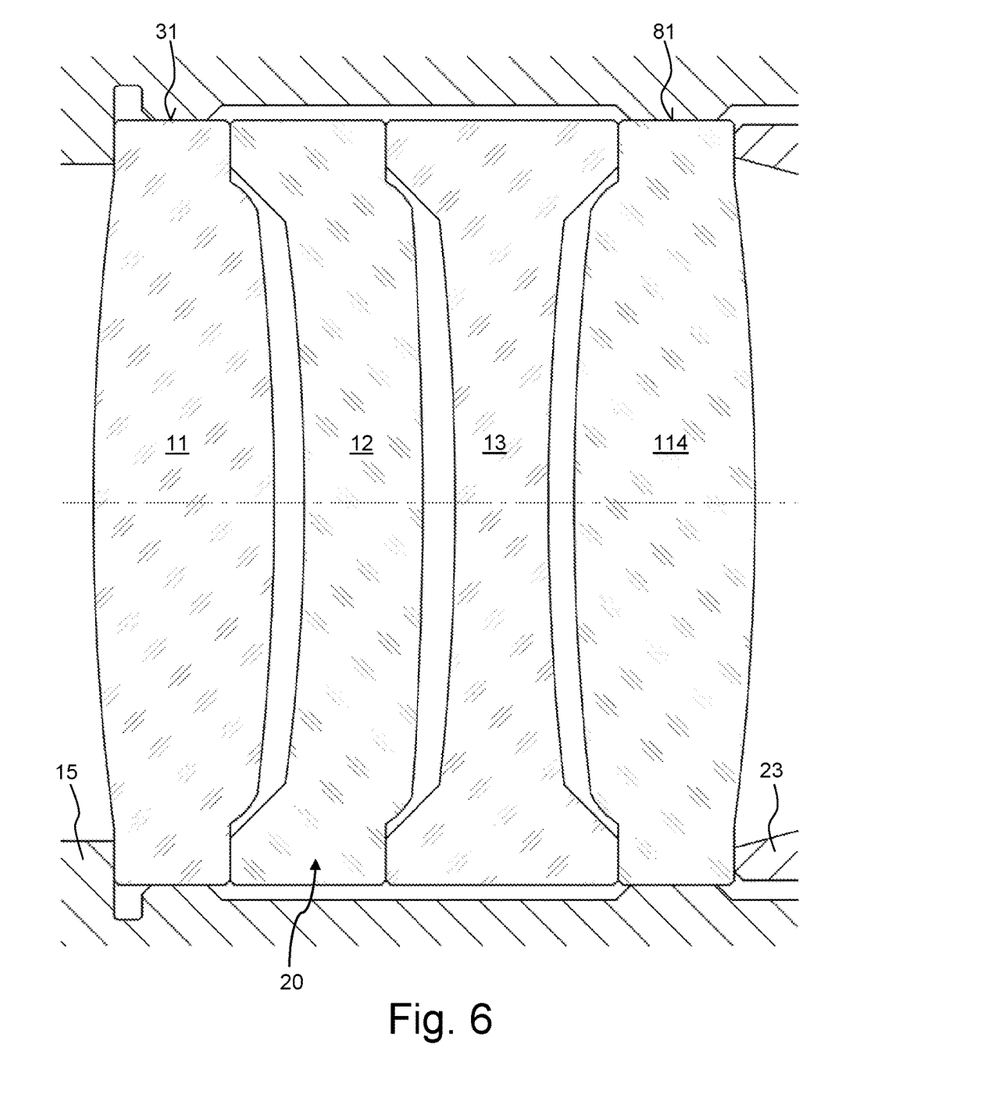
FIG. 6 shows a magnified illustration of a section of a second embodiment of a lens arrangement according to the invention, in the region of the lens stack, comprising two lenses that are radially aligned by the common casing.

FIG. 6 shows a second embodiment of a lens arrangement according to the invention, which largely corresponds to the lens arrangement of FIGS. 1 to 3, in the region of the lens stack 20. Hence, only the predominant differences are intended to be explained.

Once again, four lenses 11, 12, 13, 114 are arranged in a common casing 15. The lens 11, as only lens, is directly axially aligned by the casing 15. In this embodiment, two lenses, namely the lenses 11 and 114, are directly radially aligned by the casing 15. The remaining lenses 12, 13 are radially aligned by the lenses 11 and 114. The radial alignment of the lens packet 20 may, overall, be even more exact as a result of the radial alignment of two lenses 11, 114 by way of the casing 15. However, in this embodiment, it is necessary to ensure that there can be no radial tensions as a result of radial clamping in the casing 15 for both lenses 11, 114, in particular by a material selection that is matched to the casing 15. As a result, the material selection for the lenses 11, 12, 13, 114 is slightly restricted overall in this embodiment. Moreover, the various portions of the inner wall 31, 81 of the casing 15 must be manufactured with high accuracy relative to one another.

Figure 7:
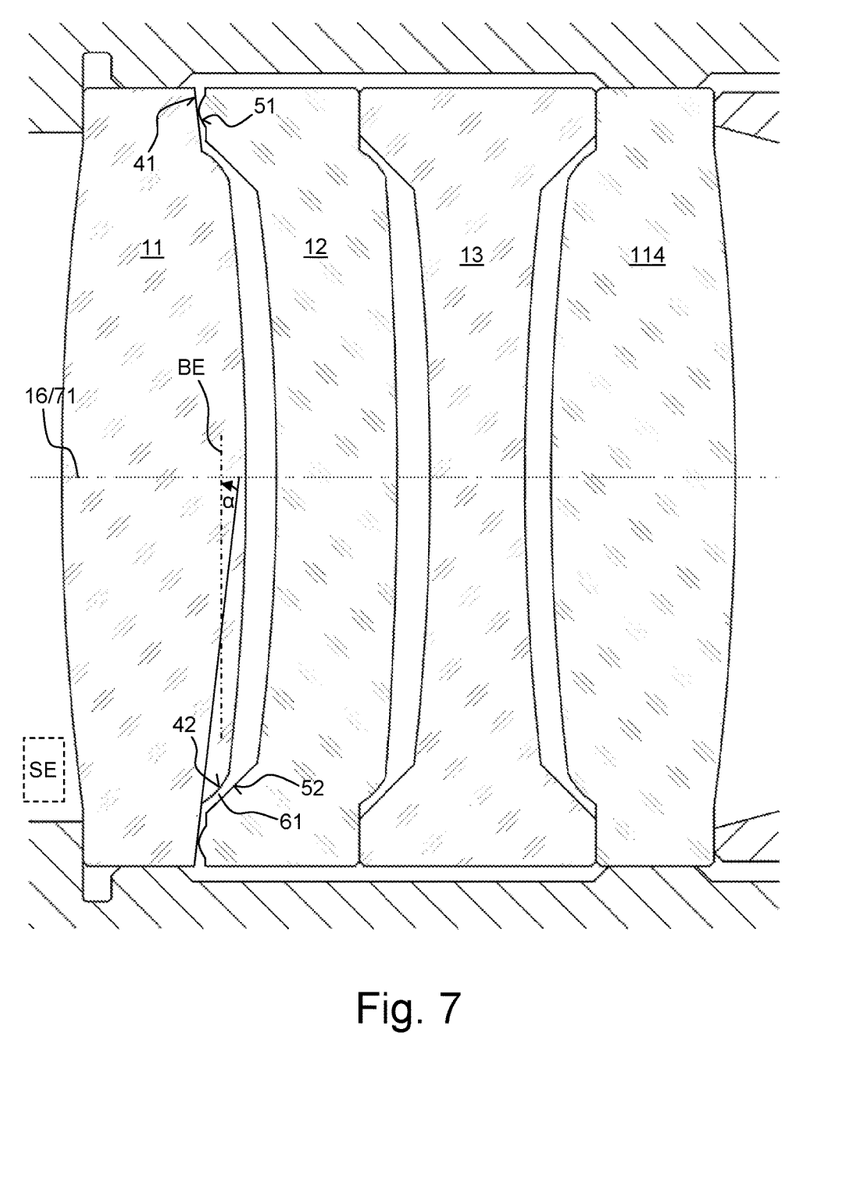
FIG. 7 shows a magnified illustration of a section of a third embodiment of a lens arrangement according to the invention, in the region of the lens stack, comprising a lens with the first abutment face with a small gradient angle.

FIG. 7 shows the region of a lens stack 20 for a third embodiment of a lens arrangement according to the invention. Only the predominant differences to FIG. 6 are explained.

Here, the lenses 11, 12 rest against one another with first abutment faces 41, 51. Here, the first abutment face 41 of the lens 11 is embodied as a lateral face of a conical frustum with a very small gradient angle α of approximately 7° in this case, measured against a reference plane BE, which lies perpendicular to the optical axis 71 of the lens 11 (which in this case coincides with the common optical axis 16). The sectional plane SE (the plane of the drawing in this case), in which the gradient angle α is measured, contains the optical axis 71 of the lens 11. Here, the first abutment face 51 of the lens 12 is embodied as lateral face of a toric segment. The small gradient angle α of the first abutment face 41 only permits a relatively small possibility of tilting of the lenses 11, 12 over the radial play of the lenses 11, 12 (cf. over the small gap 61 between the second abutment faces 42, 52). However, this possible tilt is usually tolerable in the case of a sufficiently small gradient angle α.

LIST OF REFERENCE SIGNS

1 Lens system
2 Abutment faces
3 First end
4 Second end
11 Lens (aligned radially and axially by the casing)
12-14 Lenses
15 Common casing
16 Common optical axis
17 Shoulder
18 Contact face
20 Lens stack
21 Tensioner
22 Tensioning apparatus
23 Abutment ring
23a Abutment ring face
24 Contact face
25 Spring element
26 Tensioning ring
27 Thread
28 Counter thread
29 Connection thread
30 Radial edge
31 Inner wall
32 Gap (inner wall/radial edge, at lens 11)
41 First abutment face
41a Planar ring face
42 Second abutment face
42a Projection
43 Optically effective face
51 First abutment face
51a Planar ring face
52 Second abutment face
52a Opening
53 Optically effective face
61 Gap (second abutment faces)
62 Radial edge
63 Inner wall
64 Gap (radial edge/inner wall, at lens 12)
71 Optical axis (lens 11)
72 Optical axis (lens 12)
81 Inner wall
114 Lens (radially aligned by the casing)
α Gradient angle
BE Reference plane
BR Width (gap 61)
SE Sectional plane

The invention claimed is:

1. A lens arrangement for an optical unit operating transmissively and refractively in a predetermined spectral range, comprising:
at least two lenses, wherein each of the at least two lenses transmits in the predetermined spectral range,
a common casing, in which the at least two lenses are arranged in sequence, wherein the lenses are at least substantially aligned radially, axially and angularly inclined with respect to a common optical axis,
wherein adjacent lenses of the at least two lenses form respective abutment faces that face one another, and wherein the adjacent lenses rest against one another by way of the respective abutment faces, and
an elastic tensioner configured to provide axial pressure to the sequence of lenses,
wherein a first of the lenses is axially aligned by the common casing;
wherein a first subset of the lenses in the sequence are radially aligned by the common casing,
wherein a gap is formed between each lens of a second subset of the lenses and the common casing such that each lens of the second subset of the lenses is not radially aligned by the common casing, and wherein the second subset of the lenses in the sequence are aligned by the respective abutment faces of the respectively adjacent lenses, such that all lenses of the sequence are aligned radially, axially and angularly inclined with respect to the common optical axis.

2. The lens arrangement as claimed in claim 1, wherein the predetermined spectral range lies in the infrared spectral range.

3. The lens arrangement as claimed in claim 2, wherein the infrared spectral range comprises at least part of the wavelength range from 2 μm to 13 μm.

4. The lens arrangement as claimed in claim 1, wherein at least some of the at least two lenses comprise different materials which transmits in the predetermined spectral range.

5. The lens arrangement as claimed in claim 1, wherein the respective abutment faces of the respectively adjacent lenses are formed in radially outer regions of the lenses, wherein optically effective faces of the lenses are formed in radially inner regions of the respectively adjacent lenses, and wherein the respectively adjacent lenses rest against one another only with abutment faces that face one another, but excluding the optically effective faces.

6. The lens arrangement as claimed in claim 1, wherein the adjacent lenses in the sequence respectively form first abutment faces that face one another, wherein at least one of the first abutment faces is embodied as substantially flat and substantially perpendicular to a respective optical axis of the respective lens.

7. The lens arrangement as claimed in claim 6, wherein a maximum local gradient angle α of a first abutment face does not exceed an absolute value of 15°, wherein the local gradient angle α is measured in relation to a reference plane, which extends perpendicularly to the optical axis of the lens, and within a sectional plane, which contains the optical axis of the lens.

8. The lens arrangement as claimed in claim 6, wherein the first abutment faces are rotationally symmetric in relation to the respective optical axis of the respective lens.

9. The lens arrangement as claimed in claim 6, wherein at least one of the first abutment faces that face one another respectively extends perpendicularly to the optical axis of the respective lens.

10. The lens arrangement as claimed in claim 9, wherein the first abutment faces are ring-shaped plane faces.

11. The lens arrangement as claimed in claim 6, wherein lenses that are respectively adjacent in the sequence form second abutment faces that face one another, wherein one of the second abutment faces forms an opening that widens toward the other lens and/or one of the second faces forms a projection that tapers toward the other lens, and wherein the lens arrangement is embodied such that, at a temperature $T_{soll}$, the first abutment faces that face one another of adjacent lenses rest against one another in the sequence, and play remains between the second abutment faces that face one another of adjacent lenses.

12. The lens arrangement as claimed in claim 11, wherein, at the temperature $T_{soll}$, the first abutment faces that face one another of the adjacent lenses rest against one another in a planar fashion, and wherein the temperature $T_{soll}$ is 20° C.

13. The lens arrangement as claimed in claim 1, wherein lenses that are respectively adjacent in the sequence form second abutment faces that face one another, wherein one of the second abutment faces forms an opening that widens toward the other lens and/or one of the second faces forms a projection that tapers toward the other lens.

14. The lens arrangement as claimed in claim 13, wherein a local gradient angle α of at least one of the second abutment faces has an absolute value of between 25° and 65°, wherein the local gradient angle α is measured in relation to a reference plane, which extends perpendicularly to the optical axis of the lens, and within a sectional plane, which contains the optical axis of the lens.

15. The lens arrangement as claimed in claim 14, wherein the local gradient angle α of at least one of the second abutment faces has an absolute value of between 30° and 60°.

16. The lens arrangement as claimed in claim 1, wherein a lateral face of at least one of the second abutment faces is substantially in the form of at least one of a frustum, a spherical layer, or a toroidal disk.

17. The lens arrangement as claimed in claim 1, wherein one of the second abutment faces that face one another forms an opening that widens toward the other lens and corresponds substantially to the lateral face of a frustum, and the other of the second abutment faces that face one another forms a projection that tapers toward the other lens and corresponds substantially to a lateral face of a toroidal disk.

18. The lens arrangement as claimed in claim 1, wherein a difference between a coefficient of thermal expansion of the common casing and the lenses of the first subset is less than a difference between the coefficient of thermal expansion of the common casing and the lenses of the second subset.

19. The lens arrangement as claimed in claim 1, wherein the lens which is axially aligned by the common casing is arranged at a first end of the sequence of lenses, and a lens, at which the elastic tensioner engages, is arranged at a second end of the sequence of lenses which lies opposite the first end.

20. The lens arrangement as claimed in claim 1, wherein all optically effective faces and abutment faces of a given one of the lenses are produced in a same clamping operation during manufacturing of one side of the given one of the lenses.

* * * * *